(No Model.) 2 Sheets—Sheet 1.
C. W. MILLER.
CONVEYER.
No. 526,405. Patented Sept. 25, 1894.
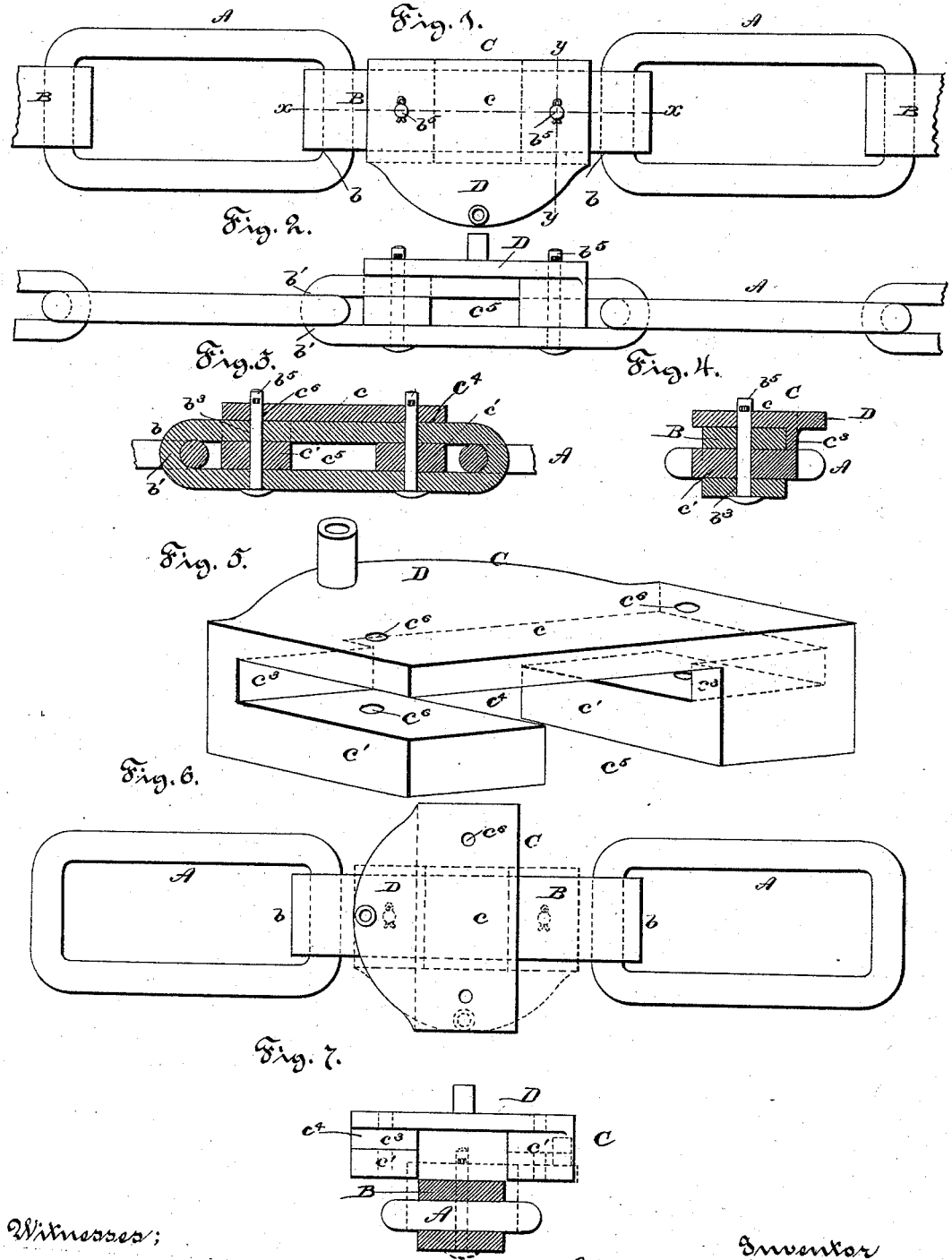
Witnesses:
J. H. Coleman
M. B. May
Inventor
Charles W. Miller
by Doubleday & Bliss
Attys.

(No Model.) 2 Sheets—Sheet 2.

C. W. MILLER.
CONVEYER.

No. 526,405. Patented Sept. 25, 1894.

Witnesses:
J. T. Coleman
M. B. May

Inventor
Charles W. Miller
by Doubleday & Bliss
Att'y's

THE NORRIS PETERS CO., PHOTO-LITHO., WASHINGTON, D. C.

UNITED STATES PATENT OFFICE.

CHARLES W. MILLER, OF COLUMBUS, OHIO, ASSIGNOR TO JOSEPH A. JEFFREY, OF SAME PLACE.

CONVEYER.

SPECIFICATION forming part of Letters Patent No. 526,405, dated September 25, 1894.

Application filed December 16, 1891. Serial No. 415,283. (No model.)

*To all whom it may concern:*

Be it known that I, CHARLES W. MILLER, a citizen of the United States, residing at Columbus, in the county of Franklin and State of Ohio, has invented certain new and useful Improvements in Conveyers, of which the following is a specification, reference being had therein to the accompanying drawings.

The object of this invention is to provide a device which can be readily attached to chain links for several purposes, such as strengthening and bracing them, and having them adapted to readily receive the attachments, which are used for carrying flights, buckets, &c.

The device which I have invented is particularly adapted for use on cable chains, or chains having the alternate links interlooped with the adjacent ones, and lying in a plane at right angles to the plane of said adjacent ones. The links of these chains are generally "non-detachable," each link having its ends welded together.

Figure 8:
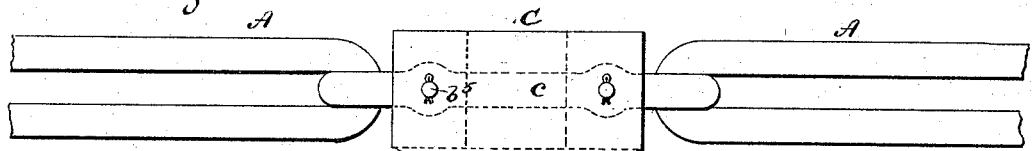
Figure 9:
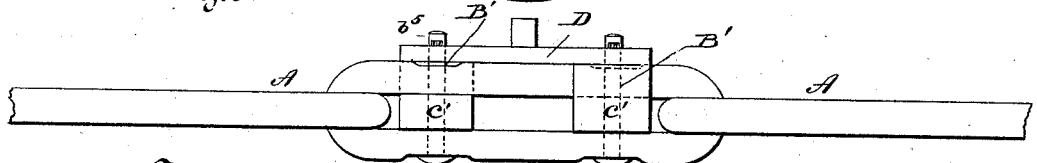
Figure 10:
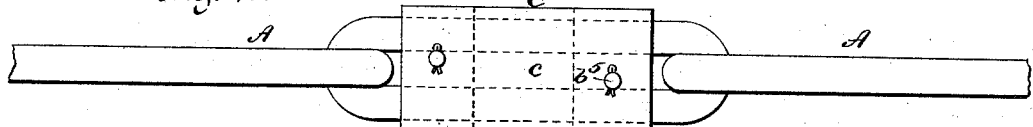
Figure 11:
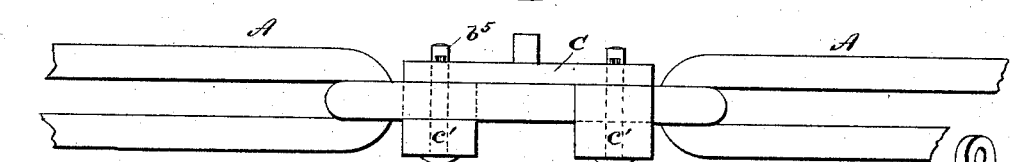
Figure 12:
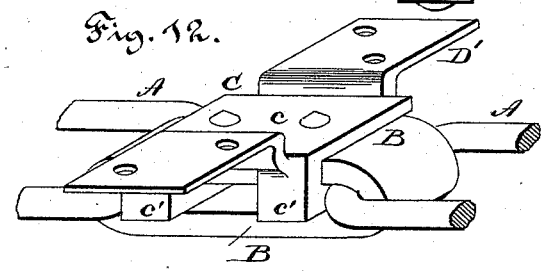
Figure 13:
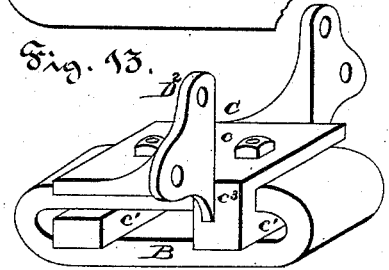
Figure 15:
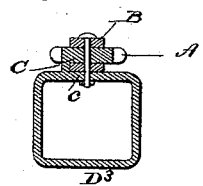
Figure 14:
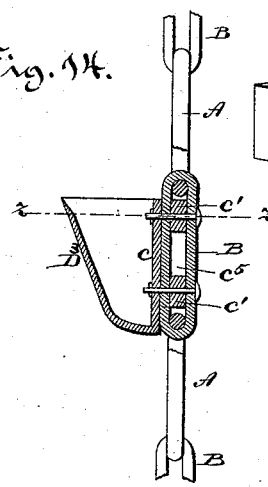
Figure 16:
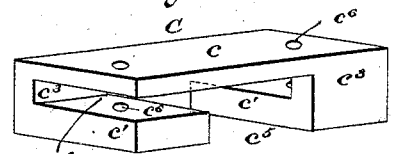

Figure 1 is a plan view of a portion of a conveyer chain having my improvements applied. Fig. 2 is a side view. Fig. 3 is a section on the line $x-x$, Fig 1. Fig. 4 is a section on the line $y-y$, Fig. 1. Fig. 5 is a perspective view of the block. Fig. 6 is a plan, and Fig. 7 is a section, showing the manner of putting the attachments in place. Fig. 8 is a top view, and Fig. 9 is a side view showing how an attachment of this kind can be secured to a modified form of chain. Fig. 10 is a side view, and Fig. 11 is a top view showing another manner of attaching the device to a chain, all of whose links are made of round rod iron. Figs. 12 and 13 are perspectives of modified forms of the attachment device. Fig. 14 is a vertical section, and Fig. 15 a cross section on lines $z-z$ of Fig. 14 showing the fastener part as being made integral with a bucket. Fig. 16 shows in perspective the essential parts which relate to spacing, bracing and fastening to the link.

In the drawings A, A, represent links of the chain, and B represents one of the connecting links. In this case the links A, A, are of the ordinary sort made of round iron or rods. The link B is a flat bar link adapted to give a wide bearing for the links A, A, at the articulating lines $b$, $b$; but the link B may be more or less similar in shape and in cross section to those at A, A. In either case the link is formed with longitudinal bars with a passage way or open space between them, in the ordinary manner. The two end parts $b'$, $b'$ are brought together and joined, by welding, or otherwise, at $b$. This chain can be made complete of any length, and kept in stock until wanted. In practice the larger quantities of it are finished in fifty foot lengths, and stored until called for. One or more apertures $b^3$ are formed in the link, for a purpose to be described.

By the use of the device herein described, the welding can be dispensed with in some cases, and yet the ends $b'$, $b'$ can be held sufficiently firm to prevent spreading, or bending up, as will be readily understood from what is set forth below.

C indicates, as a whole, a metal block adapted to strengthen and lock the links B, and also to carry the attachments of the several sorts required for various purposes. It is shown as being formed with the cross connecting bar or plate $c$, and with two separated plates $c'$, $c'$ connected to plate $c$ by connecting braces or bars $c^3$, $c^3$. These parts are so related in position that there is an open space between each plate $c'$ and the plate $c$, and at $c^5$ there is an opening between the two plates $c'$. The former openings are of a depth about equal to the thickness of the link, and the latter opening is of a length about equal to the width of the link. The plates $c'$ are also preferably of a width about equal to that of the link. At $c^6$ there is an aperture corresponding to that at $b^3$ in the link.

When it is desired to insert one of the blocks C, it is first turned so as to lie in the position shown in Fig. 6, at which time the links can slip through the aperture $c^5$ as shown in Fig. 7. After the block reaches the latter position it can be turned around part way because of the passage or open spaces at $c^4$. It can turn thus until it abuts against the stops or braces $c^3$, $c^3$. Then the block is moved to bring the apertures $b^3$ into line with those at $c^6$, and detachable pins, rivets, or bolts are passed through them and fastened. The plates $c'$ $c'$ serve to space and brace the upper and the lower bars of the link B. The stops or braces $c^3$, $c^3$ act to hold the whole block firmly in position laterally. The bar or plate $c$ and the parts $c'$, $c^3$ act together to hold the ends of $b'$ against spreading, whether there is a welding joint or not. In addition to the functions thus performed by the central or main part of the block, the following can also be performed by it.

D D represent wings, bars, arms, or plates, which can be cast solid with, or can be secured to the part C; and to these can be fastened plates, carrier bars, buckets, or other propelling devices such as are used with conveyers.

In Fig. 1 the carrying arm is of the nature of a hinge pin or pivot, adapted to have a flight, bracket, bucket or other device secured thereto so as to have a more or less limited motion around the axis of the pin. In Fig. 12 it is a laterally extending plate, or pair of plates $D'$ adapted to have a plate, bar, bucket or the like bolted thereto. In Fig. 13 it is so arranged as shown at $D^2$ that a vertical blade or flight can be attached. In Figs. 14 and 15 a bucket $D^3$ is shown attached.

In Fig. 8 the connecting link B is, like those at A, made of round iron. When so made eyes or apertures can be made at $B'$ to receive the pins or fastening devices for the block.

In Figs. 10, and 11, I have shown how the attachment may be secured to an ordinary rod link. In this case, both side bars of the link lie in the apertures $c^4$ of the attachment, that is to say, the side bars, lie between the plates $c'$ $c'$ and the plate $c$, the edges of the links abutting against the braces or bars $c^3 c^3$. The pins $b^5$ $b^5$ pass through the open center of the link and the side bars of the same are gripped between them and the said braces or bars $c^3$ $c^3$.

When pins like those at $b^5$ are used the block can be readily detached from the links, but in this respect the bolts and rivets are substantially the same, for when either one is used there is no necessity to bend the link bars, in the way that has been required in constructing links of this sort heretofore. This bending had to be employed both when attaching one of the blocks, or when detaching a broken one for the replacing of another.

Of course when I speak of earlier devices, I refer to those which are integral. I am aware of the fact that numerous attachments for cable chains have been used which were made up of two or more separate parts or which required bending when being applied. The present one is integral and has its parts in final position relative to each other prior to attachment.

It will be seen that the block is so constructed as to provide bars, walls, or stops, as at $c^3$, which lie by the edges of the link bar, and a cross bar as at $c$, on one side of the link bar, and another transversely arranged plate, as at $c'$ on the other side of the link bar. It is not absolutely necessary to have both of the transversely arranged plates $c'$, as one of them under some circumstances can be relied upon to effect the bracing of the links, and can carry more or less of the flight or bucket attachment.

In order to distinguish the various parts of the block, I have termed the main portion $c$, a "plate," and have referred to the portions $c'$ $c'$ as "plates" and to the portions $c^3$ $c^3$ as "bars," but it will be understood that I do not mean to limit myself by this phraseology to just the forms of the various parts. I have also referred to the bars $c^3$ as stops and braces, for it will be seen that they perform two functions, namely to connect the plates $c'$ $c'$ with the main plate $c$, and to serve as stops to prevent direct lateral movement of the link. Between the two plates $c'$ $c'$, there is a transverse opening $c^5$ into which the link is first inserted, when the attachment is to be secured to the link. Then, between the plates $c'$ and the plate $c$, there is a throat or opening $c^4$, which extends the whole length of the plate $c$.

What I claim is—

1. The combination with the chain, of the block having a passage $c^5$ transverse to the longitudinal lines of the chain, and adapted to receive a link, said block having a passage $c^4$ extending the length of the block, and communicating with said passage $c^5$ whereby when the link is placed in the said passage, $c^5$, said block may be rotated so that the link lies in the other said passage $c^4$, substantially as set forth.

2. The combination with the chain having links formed with longitudinal bars, of the block having a plate $c$ extending from one side of one of said links to the other side and having vertically extending bars $c^3$ with a passage between them for the link, and a supplemental horizontally extending plate $c'$, one of said plates $c$ $c'$ being adapted to lie between said longitudinal link bars, substantially as set forth.

3. The attachment block for a chain having the plates $c$, the bars $c^3$ lying transverse to said plate $c$, and the plate or plates $c'$ parallel to the plate $c$, and connected to bars $c^3$ and adapted to lie between the bars of a chain link, substantially as set forth.

4. The combination with the chain having links, each formed with longitudinal bars, one above the other, of a block adapted to be detachably secured to one of said links and having two bars, one to abut against each side of said link, a plate connecting said bars and lying on one side of one of said longitudinal bars, and a plate on the other side of said longitudinal bar, substantially as set forth.

5. The combination with the chain link having a passage-way between its longitudinal bars, of a detachable block having a bar at each side of the link, a plate between the longitudinal bars of the link, and a cross plate connecting the said side bars of the block, substantially as set forth.

6. The herein described flight-carrying attachment for a chain link having a plate which lies between the side-bars of the link, bars which lie at the edge of the said side bars, and the connecting plate $c$, said attachments being detachable from the link, substantially as set forth.

7. The herein-described flight carrying attachment for a chain link, having a plate $c'$ lying between the longitudinal bars of the link, bars $c^3$ lying at the edges of said link side bars, and a plate connecting said bars $c^3$ and having a lateral projection, or ear adapted to have a flight fastened thereon, substantially as set forth.

8. The combination with a chain link having its longitudinal bars one above the other, of a block detachable from the chain link having two bars, one abutting against each side of the link and having a plate $c'$ lying between the link bars, and a supplemental fastening device for detachably securing the block to one of the side bars of the link, substantially as set forth.

9. The combination with a chain link having its longitudinal bars one above the other, of a block having a plate lying above one of the link bars, and having a plate secured thereto and lying between the longitudinal bars of the link and a pin or bolt passing directly through said link bars and said plates, substantially as set forth.

10. The combination with the chain link having a passage way between its longitudinal bars, of a detachable block having a plate lying between said longitudinal bars, a plate outside of said link bars, parallel with and opposite to the aforesaid plate, a stop for preventing lateral movement of the block in one direction, and a fastening device for securing said block to the link bars, substantially as set forth.

In testimony whereof I affix my signature in presence of two witnesses.

CHARLES W. MILLER.

Witnesses:
GEO. C. HOIST,
SAML. R. MOUNTAIN.